3,505,086
PAINTS CONTAINING ZINC DUST, ALKALI SILICATES AND ORGANIC NITRO COMPOUNDS

Helmut V. Freyhold, Dusseldorf-Oberkassel, Germany, assignor to Henkel & Cie, G.m.b.H., Dusseldorf-Holthausen, Germany
No Drawing. Filed Aug. 12, 1968, Ser. No. 751,736
Claims priority, application Germany, Aug. 18, 1967,
H 63,639
Int. Cl. C09d 5/10
U.S. Cl. 106—1                                              5 Claims

ABSTRACT OF THE DISCLOSURE

Corrosion resistant paints comprising metal dust together with an alkali silicate binding agent in which the agent includes an organic nitro compound soluble in aqueous solutions of the silicates together with boric acid or salts thereof.

---

The use of so-called metal dust paints for prevention of corrosion of metals, such as iron, using alkali silicates as binding agents is well known. In particular, zinc dust paints are used for that purpose. However, aluminum, lead or copper dusts have also been found suitable, the latter being preferably used in a mixture with zinc dust. Such coats are extremely effective and stable as corrosion protection. In practice, however, their preparation is difficult because the mixtures of alkali silicates and metal dust, especially zinc dust, are usable for only a short time, since the components react relatively fast with generation of hydrogen. Therefore, considerable difficulties exist in storage and shipping of such materials.

There are already known inhibitors which retard the reaction between the alkali silicate solution and the zinc dust. However, the results are often unsatisfactory for the requirements of commercial use. If lead oxide and sodium persulfate are added to such paints the hydrogen generation is delayed about 24 hours. This, obviously, is still inadequate in most cases.

Recently, a method has become known by which the stability of such mixtures (so-called "pot life") can be considerably improved. This improvement is achieved by an addition of alkali chromate and organic compounds which contain at least 2 amino groups in the molecule. In accordance with the present invention, it has been found that the "pot life" of paints of this character can be further extended by the addition of organic nitro compounds soluble in aqueous alkali silicate solutions, as well as boric acid or its salts.

Suitable organic nitro compounds are aliphatic nitro compounds such as nitromethane, nitro acetic acid, nitrobenzoic acid, nitrophenols, dinitrophenols, nitroresorcin, nitrobenzocatechin, nitrourea, and nitroguanidine. Nitromethane, nitrobenzoic acid and nitrophenol were of particular advantage. The nitro compounds are used in amounts of 0.1%–5%, preferably 0.4–1.2% (by weight), based on the solid alkali silicate.

As further components, the preferred form of the invention provides boric acid or its salts; e.g., potassium or sodium borate or also ammonium borate. These compounds are added in amounts of 0.5%–3%, preferably 0.8%–1.5% (by weight), based on the solid alkali silicate.

The additions can be made in the form of solutions or in solid form, and mixed with the metal dust paints during or after their preparation. The metal dust paints are prepared in the usual manner by mixing alkali silicate solution with metallic dust, especially zinc dust. Sodium silicate or potassium silicate solutions with a mol ratio of $Na_2O:SiO_2$ of 1:3.2 to 3.8, and a concentration of about 28 to 42° Baumé can be used.

Especially effective corrosion resisting metal dust paints are obtained when alkali silicate solutions with a mol ratio of alkali oxide: $SiO_2$ of over 1:3.8 to 1:4.4 are used. Such alkali silicate solutions are especially easy to coat and work when they contain in addition about 0.1–2% by weight of certain quarternary ammonium compounds. There may be used here water-soluble quarternary ammonium bases which contain an alkyl radical of 1–4 carbon atoms and 3 further alkyl or alkanol radicals with 1–12 carbon atoms. Preferably, tetraethyl ammonium hydroxide is used.

In addition, the metal dust paints, especially zinc dust paints, can contain thickening additives, such as alginates, methyl cellulose and starch, in amounts of about 0.01–0.3% by weight, based on the total mixture. In some cases, it is of advantage to add small amounts (up to 0.5% by weight) of emulsifiers; particularly ethylene oxide addition compounds of fatty alcohols or fatty acids. To the paints can also be added diluents, such as kaolin, bentonite, montmorillonite, and zinc oxide.

Metal dust paints of the above described kind which contain the additives according to the invention have a "pot life" of more than 3 weeks, i.e., prior to this time no measurable generation of hydrogen takes place if they are stored in non-metallic containers. It is also possible to use extremely fine zinc dust in these paints which normally reacts even with distilled or tap water. The use of this zinc dust is desirable when especially waterproof paints are required. The resistance to water can further be improved in that alkali silicate solutions with a high percentage in $SiO_2$ are usable.

To illustrate the invention still further, the following examples are given:

EXAMPLE 1

300 g. of alkali silicate solution (mol ratio $Na_2:SiO_2$ 1:3.8; $SiO_2$-content 22.4% by weight) are mixed with a dispersion of 45 g. of water, 0.9 g. boric acid and 0.3 g. of 2,6-dinitrophenol until a clear solution is obtained.

1.1 kg. of zinc dust (zinc content 99.2; particle size 2–4 microns) is mixed with 240 g. of the mixture at room temperature. The resultant zinc dust paint can immediately be brushed or sprayed on. After 3 weeks of storing in a plastic container it is still usable as before, after stirring, without any loss in quality.

EXAMPLE 2

In the method according to Example 1, there is added to the alkali silicate solution 1 g. of sodium borate and 0.3 g. of nitromethane or 0.5 g. of p-nitrophenol. There is obtained a zinc dust paint which remains stable in the container for at least 3 weeks.

EXAMPLE 3

3 g. of a 20%-tetraethyl ammonium hydroxide solution are dissolved with 1 g. of ammonium dichromate, mixed in 24 g. of ion-free water and the mixture stirred into 215 g. of water glass (the mol ratio of $Na_2O:SiO_2$ is 1:3.8, solid content 29%).

There is also added 0.6 g. of boric acid and 0.2 g. of o-nitrobenzoic acid and the mixture so prepared mixed with 1100 g. of zinc dust (zinc content 99.2%; size of particle 2–4 microns). There is obtained a zinc dust paint which is stable in a container over several weeks, has a good coating property and only a short setting time.

Satisfactory results are also obtained if a corresponding amount of dinitrophenol, nitrourea, nitroguanidine, nitro acetic acid, nitroresorcin or nitrobenzocatechin is substituted for the nitrobenzoic acid of this example. In using the aromatic nitro compounds, the positions of the substituents on the nucleus do not have any material effect.

In the foregoing examples, the tetraethyl ammonium hydroxide may be replaced by one or more quaternary ammonium bases having one alkyl radical of 1–4 carbon atoms and three additional alkyl or alkanol radicals having 1–12 carbon atoms.

The foregoing examples are illustrative only and the invention is to be broadly construed and not to be limited except by the character of the claims appended hereto.

What is claimed is:

1. Corrosion resistant paints comprising zinc dust and a binding agent taken from the class consisting of aqueous alkali silicate solutions wherein said binding agent includes at least one organic nitro compound selected from the group consisting of nitromethane, nitroacetic acid, nitrobenzoic acid, nitrophenols, dinitrophenols, nitroresorcin, nitrobenzocatechin, nitrourea, nitroguanidine and mixtures thereof, said organic nitro compound being soluble in said aqueous solutions of said silicates, and boric acid or salts thereof, said organic nitro compound being present in an amount of 0.1 to 5.0% by weight based on the solid alkali silicate and said boric acid or salts thereof being present in an amount of 0.5% to 3.0% by weight calculated as boric acid based on the solid alkali sicilate.

2. Paints according to claim 1, said organic nitro compound being present in an amount of 0.4 to 1.2% by weight based on the solid alkali silicate and said boric acid or salts thereof being present in an amount of 0.8% to 1.5% by weight calculated as boric acid based on the solid alkali silicate.

3. Paints according to claim 1 wherein the mol ratio of alkali oxide to $SiO_2$ of said silicate is 1:3.8 to 1:4.4.

4. Paints according to claim 1 wherein there is present at least one quaternary ammonium base having one alkyl radical of 1–4 carbon atoms and three additional alkyl or alkanol radicals having 1–12 carbon atoms.

5. Paints according to claim 4 wherein said base is present in an amount of 0.1 to 2.0% by weight based on the solid alkali silicate.

References Cited

UNITED STATES PATENTS 3,287,142  12/1966  Russell _____ 106—14

JULIUS FROME, Primary Examiner

T. MORRIS, Assistant Examiner

U.S. Cl. X.R.

106—14, 287; 117—131, 135.1